Dec. 29, 1953
D. C. BOND
2,664,398
ACIDIZING WELLS
Filed Dec. 2, 1952
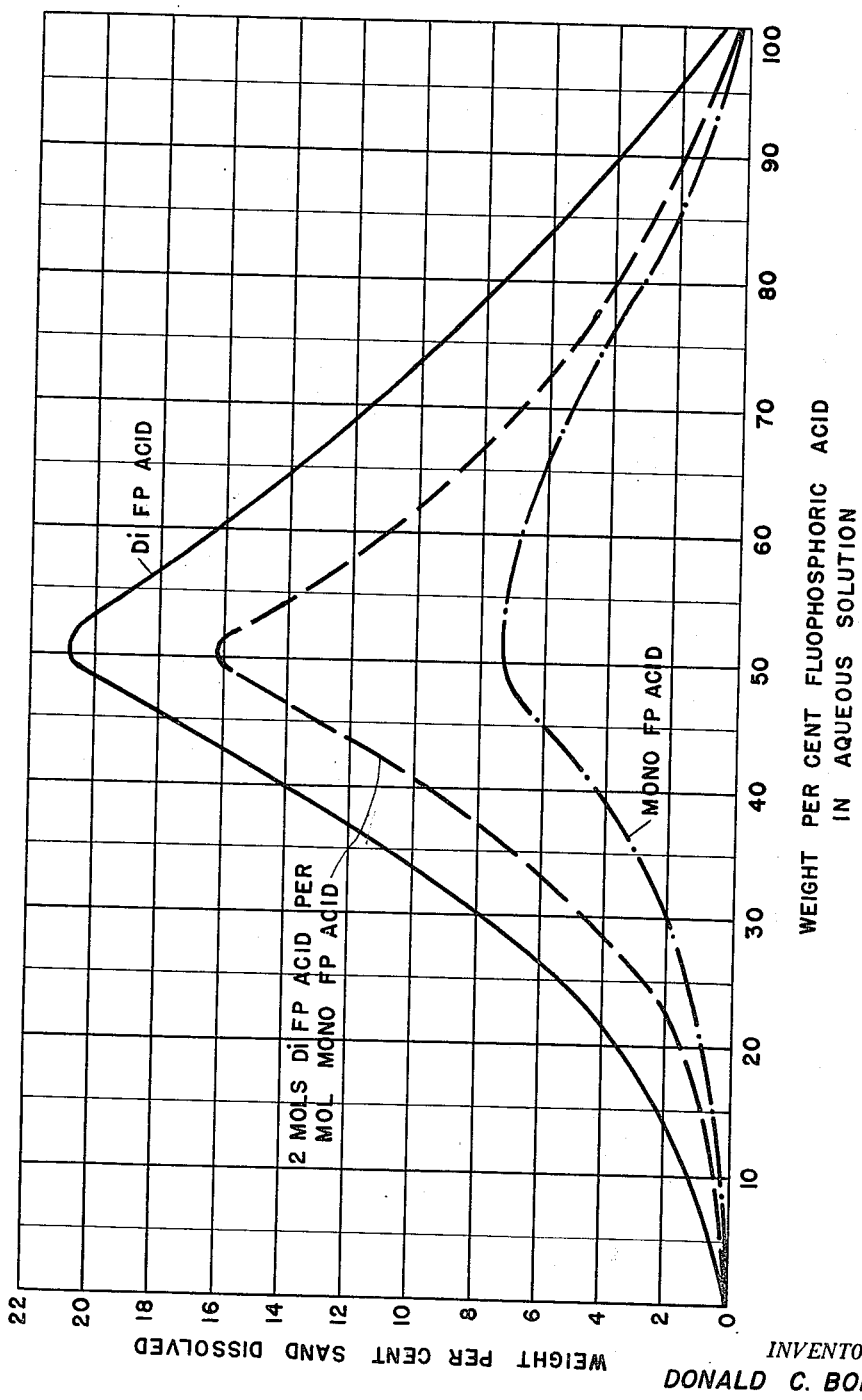
INVENTOR.
DONALD C. BOND
BY
Edward H. Lang
ATTORNEY Patented Dec. 29, 1953

2,664,398

UNITED STATES PATENT OFFICE 2,664,398

ACIDIZING WELLS

Donald C. Bond, Crystal Lake, Ill., assignor to The Pure Oil Company, Chicago, Ill., a corporation of Ohio Application December 2, 1952, Serial No. 323,603

16 Claims. (Cl. 252—8.55)

This invention pertains to the art of chemically treating wells to reduce or remove siliceous formations or deposits present therein. It is more particularly concerned with the acid treatment of subterranean siliceous formations or deposits encountered in the development of subterranean fluid reservoirs and the exploitation of the fluids therein. This is a continuation-in-part of my prior application Serial Number 178,953, filed August 11, 1950, now abandoned.

A well known expedient employed in the completion of oil wells drilled into oil-bearing reservoirs, the stimulation of production from partly depleted reservoir formations, and the preparation of wells for water-flooding or secondary recovery operations is the practice of acid treatment. The most familiar type of acid treatment or "acidization," in general, comprises the introduction of an acid usually of the mineral type into geological formations which have low permeability or lack continuous porosity whereby the acid reacts with the said formation and dissolves by chemical reaction therewith a part of formation surfaces exposed to the treating fluid. This results in an enlargement of the pores within the formation through which the reservoir fluid may pass with decreased resistance. The art had its beginning in the acidization of calcareous formations where hydrochloric acid, in suitable concentrations, is generally used. It subsequently was found, however, that siliceous formations as well as calcareous respond to proper acid treatment and the effective use of acids thus permitting acidization of formations other than those containing limestone or dolomite. The acids that have been used in this aspect of acid treatment have for the most part consisted of anhydrous or aqueous solutions of hydrogen fluoride either per se or formed within the formation by injecting into the formation a plurality of reactants which interact thereby forming in situ as one product of reaction hydrofluoric acid. The hydrofluoric acid then reacts with siliceous components of the formation to effect the desired result. Various modifications of this hydrogen fluoride acidization which have been tried are also disclosed in the prior art. These ramifications have mainly consisted of various mixtures of hydrogen fluoride and various other mineral acids such as phosphoric acid, sulfuric acid, hydrochloric acid, and so forth. All of these treating procedures in which hydrogen fluoride has been used as an essential constituent have inherent disadvantageous qualities, such as the formation of gelatinous precipitates which tend to plug up the formation and the harmful physiological effect on the skin tissue of humans and animals when contacted with the hydrogen fluoride-containing treating solutions of the prior art. These attendant disadvantages have minified the use of chemical treating methods employing these reagents. However, I have found that certain chemical treating reagents, namely, fluophosphoric acids, exhibit all the advantages of hydrogen fluoride and hydrofluoric acid for the dissolution of siliceous materials without being encumbered by the concomitant detrimental effects of the foregoing hydrofluoric acid and hydrogen fluoride-containing well treating compositions.

These reagents are admixed with water to provide suitable treating solutions. Although aqueous solutions in general are effective media for treating siliceous geological formations, I have further discovered that there exists a critical concentration above or below which the efficacy of the treating solution is considerably reduced.

Although the foregoing discussion was confined to the application of this invention to the acid treatment of subterranean geological siliceous formations, the propensity of fluophosphoric acids to react with silica-containing compositions without inimical effects produced by similar prior art reagents makes the use of the subject chemical reagents advantageous for other applications in the oil fields. One such use would be the removal of mud filter cakes deposited on the wall of a well bore as the result of circulating clayey drilling fluids within the earthen borehole during drilling thereof. The clay components of the fluids are hydrous alumino-silicates which are deposited on the walls of the well and within the pore interstices and crevices of the wall rocks. While the prior art has taught the use of mechanical scrapers and wall guides to effectuate the removal of the clay deposits, these methods have inherent mechanical disadvantages. An improvement in these processes consists of the removal of the clay sheath from the well walls by acid treatment. However prior art acid treatments, which generally employ so-called "mud acids," while operative, are not as effectual as the chemical reagents encompassed by the instant invention as will hereinafter be seen.

Another problem which is solved by the subject invention occurs in producing fluids from unconsolidated or fine sands. These loose sands have a tendency to clog screens or perforations in tubing liners. The use of an aqueous solution of a fluophosphoric acid containing a sufficient nount of an inhibitor to prevent the acid from reacting with the screen or tubing material will allow the selective removal of the sand deposits from within the screen openings or tubing perforations which otherwise would have to be removed with a swab. Even in the event that the difficulties present in producing from unconsolidated or fine sands are overcome by the practice of gravel packing which involves surrounding with gravel the perforated liner traversing the producing formation by means of conventional gravel packing techniques using either prepacked liners or gravel envelopes positioned by circulation methods, siliceous accumulations still occur. The instant invention however provides a method whereby the gravel packing may be purged in situ of these siliceous accumulations. Although the gravels generally employed in preparing these gravel packs are of a siliceous nature, the relatively small surface area exposed to the treating solution, as compared with the much greater area presented by the unconsolidated sands which accumulate in the gravel pack interstices, precludes any substantial or inimical disintegration of the gravel pack.

It is also possible to employ the instant invention to combat the solidified hydrocarbon problem which occurs in wells producing paraffinic crude oils. These hydrocarbon deposits, which are more commonly referred to as paraffin deposits, tend to accumulate in the tubing and flow lines of the producing equipment. Conventional techniques embody the use of mechanical scrapers, circulation of hot oil, or the injection of chemicals. Each method has advantages depending upon the type of conditions encountered. The instant method is a species of the chemical injection method wherein a combination of chemical reagents are intermixed immediately adjacent the position of the paraffin deposit and caused to react. The reagents are selected to yield a high heat of reaction which fluidizes the solid paraffinic deposit to facilitate its removal. The instant invention may likewise be used in this manner and has the further advantage of functioning more expeditiously where the nucleus upon which the paraffin deposits form are siliceous in nature. In employing the instant invention in this capacity, a fluophosphoric acid and water are commingled adjacent the paraffin deposit. The commingling of these reagents causes the hydrolysis of the fluophosphoric acid and the evolution of the resulting heat of hydrolysis. This will at least partially melt the paraffin deposit and cause the siliceous nuclei to be exposed, permitting the aqueous fluophosphoric acid solution to react therewith and produce a heat of reaction. The additional heat thus produced functions as an added impellent to expedite the removal of the remaining paraffinic deposit.

From the foregoing illustrative but non-limiting applications of the subject invention it is obvious that those skilled in the art may find multifarious other uses of the instant invention in the development and exploitation of fluid producing reservoirs. Thus, to avoid undue multiplicity in the appended claims, the expression "siliceous deposit" will be used generically and it is intended to encompass siliceous deposits, which are either naturally occurring or produced by the hand of man. The expression also pertains to silica-containing formations, strata, deposits or accumulations which are susceptible to attack by the chemical reagents which will hereinafter be described in greater detail. However, in the following detailed discussion of the invention, the various exemplary siliceous environments, in which the invention can be used, will be specifically referred to.

Accordingly, the prime object of this invention is to provide improved treating agents and methods for the acid treating of siliceous deposits to remove or substantially reduce the quantities of the siliceous components contained therein. Other objects and advantages of my invention will become apparent from the ensuing description and accompanying drawing.

Figure 1 is a graph showing the results obtained when samples of silica sand were contacted with various concentrations of fluophosphoric acids in aqueous solution.

According to my invention I have found that various aqueous concentrations of fluophosphoric acids will function effectively to remove or reduce the amounts of the siliceous components present in various deposits which occur in the development or exploitation of fluid producing geological reservoirs. I have also found that there exists a zone of criticality relative to the respective amounts of water and fluophosphoric acid used in the treating solution which provides the most favorable conditions for treating these siliceous deposits with the fluophosphoric acids. By effecting the deposit treatment with an aqueous solution of a fluophosphoric acid comprising substantially equal parts by weight of water and fluophosphoric acid, I am able to obtain the maximum desirable effect. Aqueous fluophosphoric acid solutions containing concentrations of acids of less than substantially equal amounts by weight of water and acid or acid concentrations of more than substantially equal parts by weight of acid and water, although operative for reacting with siliceous deposits, do not possess the acidizing efficiency of fluophosphoric acid solutions comprising acid and water in a weight ratio of about substantially 1:1. This important property of fluophosphoric acids as well as the general effectiveness of aqueous solutions of fluophosphoric acids is illustrated by the following several types of experiments.

In a lithological determination of the effect of the fluophosphoric acid treatment on siliceous formations, a series of permeability experiments were conducted wherein small cylindrical Berea sandstone cores were used for the tests. The initial permeability of the cores was determined by noting the time required to pass 25 cubic centimeters of distilled water at a gauge pressure of 408 millimeters of mercury. One hundred cubic centimeters of an aqueous acid treating solution was passed through the core in approximately one hour. After the acid treatment, the time required to pass 25 cubic centimeters of water through the treated core at a gauge pressure of 408 millimeters of mercury was again determined. The results of these tests are presented in Table I. In the following tables the fluophosphoric acids are denoted as FP acids for convenience and are distinguished compositionwise as follows:

1. *Mono FP acid.*—Anhydrous monofluophosphoric acid, principally $H_2PO_3F$, with varying amounts of $HPO_2F_2$ and $H_3PO_4$ as impurities.

2. *Di FP acid.*—Anhydrous difluophosphoric acid, over 85% $HPO_2F_2$.

3. *FP acid #3.*—Concentrated aqueous solution of hexafluophosphoric acid, approximately 65%

HPF₆, 6% HF, 8% (HPO₂F₂+H₂PO₃F+H₃PO₄), 21% water.

Use is also made in Table I of the symbol "∞." This character was employed to indicate that the liquid flowed freely through the sample and was restricted only by the apparatus appurtenances. It is not to be construed as meaning the permeability was infinite.

TABLE I

| Run | Acid concentration of aqueous solution used | HF equiv., mols/liter | Permeability | | Final permeability / initial permeability |
|---|---|---|---|---|---|
| | | | Initial, Md.¹ | Final, Md.¹ | |
| 1 | 10% HF | 5.2 | 13.8 | 29.0 | 2.1 |
| 2 | 20% HF | 10.7 | 34.1 | 194 | 5.7 |
| 3 | 30% HF | 16.5 | 21.5 | 239 | 11.1 |
| 4 | 40% HF | 22.6 | 16.8 | ∞ | ∞ |
| 5 | 12% HCl+20% NH₄F | | 17.0 | 6.8 | 0.4 |
| 6 | 16% HCl+16% NH₄F | | 5.3 | 0.0 | 0.0 |
| 7 | 34% H₂SO₄+26% NH₄F | | 14.2 | 0.0 | 0.0 |
| 8 | 28% HF+18% NH₄F | | 17.8 | 0.0 | 0.0 |
| 9 | 12% HCl+19% KF | | 9.0 | 2.7 | 0.3 |
| 10 | 17.7% H₃PO₄ + 14.4% NH₄F | | 34.0 | 13.6 | 0.4 |
| 11 | 50% Mono FP acid | 6.9 | 58 | 152 | 2.62 |
| 12 | 25% Mono FP acid | 2.9 | 61 | 68 | 1.11 |
| 13 | 12.5% Mono FP acid | 1.5 | 66 | 28 | 0.24 |
| 14 | 50% Di FP acid | 13.4 | 80 | ∞ | ∞ |
| 15 | 25% Di FP acid | 5.8 | 72 | 178 | 2.48 |
| 16 | 12.5% Di FP acid | 2.7 | 120 | 39 | 0.33 |
| 17 | 50% FP acid #3 | 26.9 | 156 | ∞ | ∞ |
| 18 | 25% FP acid #3 | 11.2 | 109 | 235 | 2.15 |
| 19 | 12.5% FP acid #3 | 5.6 | 61 | 91 | 1.49 |

¹ Millidarcy.

The results presented in Table I illustrate the effectiveness of the acids of my invention in acidizing siliceous geological formations. It will also be noted in Table I that by employing a hydrogen fluoride-regenerating mixture comprising a fluorine-containing inorganic salt, such as KF, NH₄F, etc., and a mineral acid, exemplified by HCL, HF, H₂SO₄, etc., as illustrated in runs 5, 6, 7, 8 and 9, partial or complete plugging of the core being treated resulted. The plugging in these particular instances resulted from the use of the acid-fluoride mixture and not from the subsequent passage of distilled water through the core. The concentration of fluorine-containing salt employed represents the optimum proportions that can be used as determined experimentally. Any concentration in excess of these reported concentrations, if used, would result in the formation of a solid precipitate. It is thus seen that even the most concentrated practical treating solution of the inorganic fluoride in a mineral acid has a low reactivity toward silica and, in addition, effectuates a decrease in permeability result that is obviously undesirable when it is extant in acidizing siliceous formations to increase their permeability.

The following series of experiments summarized in tabular form in Table II is included herein to exemplify the existence and illustrate the point of critical concentration of the aqueous fluophosphoric acid solution most favorable to acidization. These experiments were conducted to determine the rate of reaction of the fluophosphoric acid solutions on silica as represented by a 40 mesh sand containing 99.5% by weight of SiO₂ and 0.5% by weight of Fe₂O₃ and Al₂O₃. A small amount of sand (approximately 10 grams) was placed in a polyethylene container and the weight of sample accurately determined. Sixty-five cubic centimeters of an aqueous solution of the acid undergoing the test was introduced into the container. This assembly was almost completely immersed in a constant temperature bath in such a manner that a maximum area of sand surface was exposed to the acid solutions. While in this position the container was rotated at a constant rate of 200 revolutions per minute for exactly two hours. That part of the container which was not immersed in the said bath was maintained at the desired reaction temperature by flowing a circulating stream of water withdrawn from the constant temperature bath over the non-immersed section. After treating the sand in this manner for exactly two hours, the residual sand was washed and dried and thereafter weighed. Table II illustrates the results obtained in these tests.

TABLE II

| Run | Acid solution | | HF equiv., mols/liter | Reaction temp., °F. | Reaction time, min. | Sand dissolved, percent |
|---|---|---|---|---|---|---|
| | Acid | Conc. weight percent | | | | |
| 1 | HF | 10.0 | 5.2 | 80 | 120 | 2.51 |
| 2 | HF | 20.0 | 10.7 | 80 | 120 | 7.8 |
| 3 | HF | 30.0 | 16.5 | 80 | 120 | 16.9 |
| 4 | HF | 40.0 | 22.6 | 80 | 120 | 26.5 |
| 5 | HF | 48.0 | 27.6 | 80 | 120 | 36.3 |
| 6 | Mono FP | 33.6 | 4.2 | 80 | 120 | 2.6 |
| 7 | do | 50.1 | 6.9 | 80 | 120 | 7.4 |
| 8 | do | 66.8 | 10.2 | 80 | 120 | 5.9 |
| 9 | do | 100.0 | 18.0 | 80 | 120 | 0.3 |
| 10 | Di FP | 25.2 | 5.8 | 80 | 120 | 5.4 |
| 11 | do | 43.8 | 11.3 | 80 | 120 | 16.9 |
| 12 | do | 49.1 | 13.1 | 80 | 120 | 20.5 |
| 13 | do | 56.2 | 15.5 | 80 | 120 | 18.2 |
| 14 | do | 66.9 | 19.3 | 80 | 120 | 12.9 |
| 15 | do | 75.4 | 22.2 | 80 | 120 | 4.0 |
| 16 | do | 100.0 | 31.0 | 80 | 120 | 0.9 |
| 17 | Mixture: 1 part mono FP to 2 parts Di FP acid. | 25.3 | 5.8 | 80 | 120 | 2.8 |
| 18 | do | 50.0 | 11.5 | 80 | 120 | 16.2 |
| 19 | do | 76.0 | 20.3 | 80 | 120 | 5.0 |
| 20 | Hexa FP acid No. 3. | 50.0 | 26.9 | 80 | 120 | 22.5 |

In addition to the above tabulated summary, the attached figure illustrates more graphically the correlation between the concentration of acid used and the amount of siliceous material dissolved.

Reference is made to the columns included in Tables I and II which are concerned with the equivalent amounts of hydrogen fluoride that are found in the treating solutions tested and reported. The effectiveness of the acids of my invention is dependent upon the extent of hydrolysis of the fluophosphoric acid employed in aqueous treating solution. In the tests described, the fluophosphoric acid treating solutions were hydrolyzed to equilibrium before being used as a treating solution. In actual practice, while preferable, it is not necessary to allow the hydrolysis reaction occurring in the aqueous fluophosphoric acid solution to reach equilibrium conditions before the acid treating solution is introduced into the siliceous deposit being treated. When difluophosphoric acid is employed upon mixing with the water to produce the treating solution, sufficient hydrolysis immediately results so that an effective treating solution is provided without waiting for complete hydrolysis to result. Similarly effective results are also obtained with aqueous solution of monofluophosphoric acid which is employed immediately upon mixing. Table III illustrates this effect. I have determined that the facility with which these fluophosphoric acids hydrolyze occurs in the order of the amount of combined fluorine contained in each respective acid, that is, monofluophosphoric, difluophoshoric and hexafluophosphoric more readily hydrolyze in that order. If it is desired to obtain the full effect of the completely hydrolyzed acid, the acid treating solution after being introduced into the well bore should be permitted to stand until the acid treating solution in the well bore has completely hydrolyzed. The said hydrolyzed solution may then be introduced into the formation being treated.

TABLE III

| Run | Acid | Acid conc., weight percent | HF equiv., mols/ liter | Reaction temp., °F. | Reaction time, min. | Sand dissolved, percent |
|---|---|---|---|---|---|---|
| 1 | Mono FP | 50.0 | 6.9 | 80 | 120 | 7.4 |
| 2 | Di FP | 50.0 | 13.4 | 158 | 10 | 10.7 |
| 3 | Mono FP | 50.0 | 6.9 | 80 | 120 | 6.9 |
| 4 | Di FP | 50.0 | 13.4 | 158 | 10 | 11.5 |

NOTE.—Runs 1 and 2 were conducted with an acid solution that had been permitted to completely hydrolyze prior to being utilized. Runs 3 and 4 were conducted immediately after mixing the acid and water to produce the treating solution.

It can be shown that upon complete hydrolysis one mol of the monofluophosphoric acid yields one mol of hydrogen fluoride, one mol of difluophosphoric acid yields two mols of hydrogen fluoride, and one mol of the hexafluophosphoric acid yields six mols of hydrogen fluoride. It is seen in Table II that aqueous fluophosphoric acids are generally more effective in dissolving silica than aqueous hydrogen fluoride solutions containing the same amount of hydrogen fluoride per unit volume. However, for a given fluophosphoric acid, the reactivity toward silica passes through a maximum as the concentration of the acid increases, that is, at concentrations of substantially equal parts by weight of water and fluophosphoric acid. This aspect is manifested in Figure 1. This figure has as its abscissa a scale representing the weight per cent of fluophosphoric acid contained in the various aqueous acid treating solutions employed in the tests. The results obtained are indicated by the amount of silica sand dissolved as a result of the acid treating the silica sand samples with various concentrations of treating solutions under conditions as outlined in the foregoing Example II. This effect may be determined by referring to the ordinate of Figure 1 which is described as the weight percentage of silica sand dissolved. By correlating the concentration of fluophosphoric acid in the aqueous acid treating solution with percentage by weight of silica sand dissolved, it is thus seen that the effectiveness of the acid treating solution increases to a point at which the treating solution contains substantially equal amounts of water and fluophosphoric acid. Thereafter any increase in the amount of fluophosphoric acid employed in the treating decreases rather than increases the effectiveness of the fluophosphoric acid aqueous treating solutions thereby illustrating quite clearly the beneficial results that are to be obtained when aqueous solutions of fluophosphoric acid are employed as treating agents in the concentration shown by my invention.

As illustrative of the efficacy of aqueous solutions of fluophosphoric acids for removing mud filter cakes, reference is made to Table IV showing the effect of fluophosphoric acids on mud filter cake as compared with the use of mud acids which the prior art has heretofore accepted as satisfactory.

TABLE IV
Effect of fluophosphoric acid on mud filter cake

| Acid | Percent acid | Vol. acid through in 30 min. | Time required for passage of 250 cc. acid, min. |
|---|---|---|---|
| None (original filter test) | | 14 | |
| Water | | 5.5 | 21 |
| Mono FP | 50 | | 16 |
| 1 part Mono FP to 2 parts Di FP | 50 | | 12 |
| Di FP | 50 | | 23 |
| "Mud acid" (15% HCl 3% NH₄HF₂) | | 37 | |
| HCl | 15 | | |

These data were obtained using a synthetic mud containing 5.4 weight per cent of bentonite and 17.0 weight per cent barites in an aqueous vehicle. Filter cakes were prepared from this mud in the API Mud Filter Test apparatus, using the procedure given in API Code 29, "Standard Field Procedure for Testing Drilling Fluids (Tentative)," July 1942. The excess mud was poured from the apparatus, the screen holding the filter cake was removed, and the filter cake was washed with a gentle stream of distilled water to remove loose mud. Then the screen and filter cake were replaced in the mud filter test apparatus for treatment with acid.

In the acid treatment of the filter cakes 250 cc. of acid was poured into the apparatus and 100 p. s. i. g. nitrogen pressure was applied to force the acid through the filter cake. The test was continued for 30 minutes, or until 250 cc. of acid had passed through the filter cake, if this quantity of acid passed through in less than 30 minutes. The filter cake was then removed and washed with a gentle stream of distilled water.

Comparison of these data shows that the fluophosphoric acids tested were quite effective in disintegrating mud filter cake, while 15 per cent hydrogen chloride and mud acid had little or no effect on the cake.

In order to avoid differences caused by different contact times, an alternative test was used wherein 250 cc. of the acid was poured into the apparatus on top of the filter cake and allowed to stand in contact with the filter cake without applied pressure for 30 minutes. The acid was then poured off and the filter cake was removed and washed with distilled water. By a visual comparison of the results of this test, it was seen that mud acid had practically no effect on mud filter cake, while under the same conditions the cake was more or less completely disintegrated by 50 per cent difluophosphoric acid.

To further illustrate the advantages obtainable in utilizing the fluophosphoric acids as constituents of an aqueous well treating solution, a physiological experiment was carried out whereby the epidermis of a living human subject was contacted with a small amount of anhydrous difluophosphoric acid. Exposure to the anhydrous acid for periods of 20 seconds and 30 seconds evinced no ill effects. One, however, should use reasonable precautions when handling these acids.

In applying the teachings of my invention to a technique for the acid treatment of subterranean siliceous geological formations to bring about an increase in the permeability of said formations, advantage may be taken of methods described in United States Patents 1,891,667 or 2,018,199 to Carr or various other known methods.

As an alternative and preferred means of utilizing the acidizing reagent in the treatment of siliceous geological formations, an in situ method may be employed wherein the desired amounts of water and acid sufficient to produce the proper concentration are simultaneously introduced into the tubing at the well head. The admixing of the acid and water is effected in the tubing and the resulting solution is forced into the formation. This latter method is advantageous inasmuch as the heat of solution resulting from the in situ preparation of the aqueous acidic treating agent produces a heated treating agent. Employing a treating agent which has been heated to an elevated temperature is desirable because the rate of reaction between the siliceous formation and the fluorophosphoric acidizing reagent is a function of temperature and an increase in temperature will produce a corresponding increase in the rate of reaction. Similarly in employing the subject invention in other applications, well known procedural steps may be used.

Although various concentrations of fluophosphoric acids can be used in carrying out my invention, the preferred embodiment of my invention requires that the concentration of the acid solution, which is used in treating the selected siliceous deposit, be confined to the critical concentration hereinbefore set forth in order to obtain the most effective results. Water is commonly found in all oil fields and, if the formation that is proposed to treat contains water of necessity, this water must be substantially removed from the area of the strata that is being treated. This must be done in order to avoid the dilution of the fluophosphoric acid solution away from the most effective concentration. Again one may resort to the prior art for methods to accomplish the desired result. Nolan in his United States Patents 1,361,282 and 1,398,563 and Kennedy in his United States Patent 2,146,480 make use of the expedient of preventing the flow of water into that part of a formation in which a treating operation is being conducted by creating a back pressure within the formation by forcing a fluid under sufficient pressure into the formation in order to hold back the water. This fluid may be any non-aqueous gaseous or liquid medium such as mineral oil, natural gas, air, etc. In some instances, however, deposits are encountered in primary or secondary oil recovery operations in which production is effected by gas-drive, which are substantially free of formation water. A specific example of this type of formation is to be found in the Bartlesville sand found in Okmulgee County, Oklahoma. If such formations are to be acid-treated to increase their permeabilities, it is obviously unnecessary to have recourse to any of the foregoing methods.

After any water present in the formation area being treated has been substantially removed by any suitable means, or if the formation being treated is initially substantially free of any formation water, the acid solution is injected into the formation and allowed to stand for several hours. The optimum time of contact for best results will need to be determined by the results of field tests. There appears to be no disadvantages in allowing the acid to remain in the formation indefinitely in order to allow the reaction to proceed to completion. I have found, however, that the acid is more or less spent in six to twelve hours.

Procedural techniques for utilizing the instant invention in other applications will be obvious to those skilled in the art in view of known conventional methods or modifications thereof.

The quantity of acid to be used as well as the corresponding amount of water in treating geological formations will, of course, depend upon the extent of the formation being treated. The limits of acid treat should be from 10 to 200 barrels of acid, depending, of course, on the thickness of productive rock being treated. However, if the occasion demands, the quantity of acid used may be as high as 400 barrels or more. Similarly, the quantity of treating solution used in other applications will also be dependent upon the amounts of siliceous components present. Generally quantities of treating solutions within the lower range of amounts used in formation treating will suffice. Although an uninhibited aqueous fluophosphoric acid solution may be used, the corrosion of ferrous metals exposed to an uninhibited acid solution is so severe that in order to prevent the corrosion of equipment used in transporting the anhydrous acid as well as production equipment contacted by the treating solution, the addition of small amounts of arsenious oxide to the anhydrous acid to provide a corrosion inhibiting effect is desirable. I have found that the addition of 1 per cent to 2 per cent by weight of arsenious oxide to the anhydrous difluophosphoric acid inhibits the corrosive action of this acid on ferrous metals to the extent that only negligible corrosion is observed at ordinary temperatures. The reactivity of the fluophosphoric acid solutions inhibited with arsenious oxide is not appreciably affected. The more commonly used acid inhibitor, viz., sodium arsenite, is not recommended for use in the fluophosphoric acids since this might result in the formation of slightly water soluble sodium fluosilicate in acid spent by the reaction with the silica of the formation.

It is also preferable to conduct the treating method disclosed herein at an elevated temperature. This is desirable because I have found that the reactivity of fluophosphoric acid treating solutions is correlated to the temperature at which the reaction is carried out and that the reactivity increases twofold for every 25° F. increase in temperature. Normally it will not be necessary to preheat the formation before treating because of the elevated temperatures normally occurring in subterranean formations. In addition, a fortuitous aspect of my invention makes the heating of the formation unnecessary inasmuch as maximum heat of solution is produced when the components of my treating solution are commingled to produce the solution of maximum reactivity.

From a standpoint of reactivity, costs and safety in handling the preferred acid is anhydrous difluophosphoric acid. It is, however, within the purview of my invention to use the mono- or hexa-fluophosphoric acid or mixtures of any or all of the subject acids.

While this discussion has been mainly concerned with the chemical treatment of oil wells, it is intended that this invention may be directed to the acid treatment of other earthen boreholes used for the production of fluids other than oil which are available in subterranean reservoirs, e. g., water, natural gas, etc.

Upon recapitulation it will be seen that I have discovered an improvement in the art of chemically treating siliceous deposits encountered in the development and exploitation of fluid producing reservoirs with an acid reagent having at least the effectiveness and reactivity of hydrogen fluoride but without the attendant disadvantages resulting from the use of hydrogen fluoride per se or other means of providing hydrogen fluoride in situ whereby the proportions of the siliceous components present therein are removed or substantially reduced.

I claim:

1. In the recovery of fluids from subterranean reservoirs, the method of reducing the resistance to the flow of said fluids through siliceous deposits encountered in the development and exploitation of fluid producing reservoirs which comprises contacting said deposits with an aqueous solution of a fluophosphoric acid, said solution having a sufficient concentration of fluophosphoric acid and being present in an amount sufficient to reduce the fluid flow resistance of said formations.

2. In the recovery of fluids from subterranean reservoirs, the method of reducing the resistance to the flow of said fluids through siliceous deposits encountered in the development and exploitation of fluid producing reservoirs which comprises contacting said deposits with an aqueous solution of a fluophosphoric acid yielding theoretically at least a 5 per cent solution of hydrofluoric acid upon complete hydrolysis, in an amount sufficient to reduce the fluid flow resistance of said formations.

3. A method in accordance with claim 2 in which the acid is selected from the group consisting of monofluophosphoric, difluophosphoric and hexafluophosphoric acid.

4. A method in accordance with claim 2 in which the acid is difluophosphoric acid.

5. A method in accordance with claim 2 in which said aqueous solution is prepared by separately introducing into the borehole traversing said deposit a fluophosphoric acid and water and commingling them within said borehole to produce an aqueous solution of fluophosphoric acid and thereafter contacting the said deposit with the resulting solution.

6. A method in accordance with claim 5 in which the substantially complete hydrolysis of said fluophosphoric acid is initially effected and the said deposit is thereafter contacted with the resulting aqueous solution to react therewith.

7. In the recovery of fluids from subterranean reservoirs, the method of reducing the resistance to the flow of said fluids through siliceous deposits encountered in the development and exploitation of fluid producing reservoirs which comprises contacting said deposits with an aqueous solution of a fluophosphoric acid comprising substantially equal parts by weight of a fluophosphoric acid and water in amounts sufficient to react with said deposits and thereby reduce the resistance of said deposits to fluid flow.

8. A method in accordance with claim 7 in which the fluophosphoric acid is selected from the group consisting of monofluophosphoric, difluophosphoric and hexafluophosphoric acid.

9. A method in accordance with claim 7 in which the fluophosphoric acid employed is difluophosphoric acid.

10. In the recovery of fluids from subterranean reservoirs, the method of reducing the resistance to the flow of said fluids through siliceous deposits encountered in the development and exploitation of fluid producing reservoirs which comprises contacting said deposits with an aqueous solution of a fluophosphoric acid selected from the group consisting of monofluophosphoric, difluophosphoric and hexafluophosphoric acid, said solution being present in an amount sufficient to reduce the fluid flow resistance of said deposits.

11. The method of decreasing the resistance of siliceous formations encountered in the development and exploitation of fluid producing reservoirs to the flow of fluids which comprises introducing into a siliceous geological formation an aqueous solution of fluophosphoric acid yielding theoretically at least a 5 per cent solution of hydrofluoric acid upon complete hydrolysis and maintaining said aqueous solution therein at a temperature and for sufficient time to promote hydrolysis of the acid.

12. A method in accordance with claim 11 in which the acid is selected from the group consisting of a monofluophosphoric, difluophosphoric and hexafluophosphoric acid.

13. A method in accordance with claim 11 in which the acid employed is difluophosphoric acid.

14. A method in accordance with claim 11 in which separate proportions of water and fluophosphoric acid are forced seriatim into said formations, said water and acid being allowed to mix and hydrolyze said acid at ambient formation conditions to produce a treating solution which reacts with said siliceous formation to decrease the resistance to flow thereof, the effluent reaction products produced by the reaction of said treating solution with said siliceous formation being thereafter removed.

15. The method of increasing the permeability of a siliceous formation encountered in the development and exploitation of fluid producing reservoirs by introducing an aqueous fluophosphoric acid solution comprising substantially about 50 per cent by weight of fluophosphoric acid into said formation, said formation being substantially free of water in the formation area being subjected to said acid treatment.

16. The method of treating a siliceous deposit encountered in the development and exploitation of fluid producing reservoirs to reduce the resistance of said formation to fluid flow which comprises contacting said deposit with a fluophosphoric acid in the presence of water, said acid being present in an amount sufficient to theoretically yield at least a 5 per cent solution of hydrofluoric acid on hydrolysis.

DONALD C. BOND.

References Cited in the file of this patent

UNITED STATES PATENTS

| Number | Name | Date |
| --- | --- | --- |
| 1,877,504 | Grebe et al. | Sept. 13, 1932 |
| 1,990,969 | Wilson | Feb. 12, 1935 |
| 2,128,161 | Morgan | Aug. 23, 1938 |
| 2,225,695 | Henderson et al. | Dec. 24, 1940 |
| 2,300,393 | Ayers | Nov. 3, 1942 |
| 2,367,350 | Heigl | Jan. 16, 1945 |
| 2,408,785 | Lange | Oct. 8, 1946 |
| 2,423,895 | Lange et al. | July 15, 1947 |
| 2,425,415 | Bond | Aug. 12, 1947 |
| 2,488,298 | Lange et al. | Nov. 15, 1949 |

OTHER REFERENCES

Bulletin FPA-1, Monofluorophosphoric Acid, Difluorophosphoric Acid, 9 pages, published 1944 by Ozark Chemical Co. of Tulsa, Oklahoma. (Copy in Division 59.)